US006421951B1

(12) United States Patent
Kuhl

(10) Patent No.: US 6,421,951 B1
(45) Date of Patent: Jul. 23, 2002

(54) CONTAINER FOR DISPENSING LIVE BAIT

(76) Inventor: Ronald R. Kuhl, 327 Connecticut Dr., Erie, PA (US) 16505

( * ) Notice: Subject to any disclaimer, the term of this patent is extended or adjusted under 35 U.S.C. 154(b) by 0 days.

(21) Appl. No.: 09/471,769

(22) Filed: Dec. 23, 1999

(51) Int. Cl.[7] .............................................. A01K 97/05
(52) U.S. Cl. .............................................. 43/56; 43/55
(58) Field of Search ........... 43/55, 56, 4; 222/109–111, 222/568, 460, 154

(56) References Cited

U.S. PATENT DOCUMENTS

| 403,544 A | * | 5/1889 | Maranville | 222/568 |
|---|---|---|---|---|
| 831,419 A | * | 9/1906 | Day | 222/460 |
| 1,801,117 A | * | 4/1931 | Smith | 43/56 |
| 1,955,559 A | | 4/1934 | Narrow | 221/309 |
| 2,082,754 A | * | 6/1937 | Peterson | 43/56 |
| 2,531,551 A | * | 11/1950 | Brecht et al. | 43/4 |
| 2,545,350 A | | 3/1951 | Fuld | 222/484 |
| 2,600,826 A | * | 6/1952 | Allen | 43/56 |
| 2,644,269 A | | 7/1953 | Ormesher | 43/55 |
| 2,663,115 A | * | 12/1953 | McKissack | 43/56 |
| 2,664,854 A | * | 1/1954 | Talbot | 43/55 |
| 2,670,557 A | * | 3/1954 | Pachner | 43/4 |
| 2,857,705 A | | 10/1958 | Woodcock | 43/55 |
| 2,896,825 A | * | 7/1959 | Jackson | 222/211 |
| 3,159,314 A | | 12/1964 | De Lucca | 222/183 |
| 3,198,393 A | * | 8/1965 | Kitterman | 222/109 |
| 3,308,570 A | | 3/1967 | Horton | 43/55 |
| 3,338,482 A | * | 8/1967 | Jordan | 222/568 |
| 3,354,575 A | * | 11/1967 | Darrow | 43/56 |
| 3,380,183 A | * | 4/1968 | Donner | 43/56 |
| 3,834,062 A | * | 9/1974 | Nalepka | 43/56 |
| 4,118,807 A | * | 10/1978 | McCauley | 43/4 |
| 4,198,776 A | * | 4/1980 | Tomita | 43/56 |
| 4,207,993 A | * | 6/1980 | Ellis, Sr. et al. | 43/55 |
| 4,217,940 A | * | 8/1980 | Wheeler | 222/568 |
| 4,666,065 A | * | 5/1987 | Ohren | 222/109 |
| 4,809,870 A | * | 3/1989 | Goodall | 222/568 |
| 4,825,577 A | | 5/1989 | Brannon | 43/55 |
| 4,830,234 A | * | 5/1989 | Odet | 222/109 |
| 4,862,634 A | | 9/1989 | Surface | 43/55 |
| 4,869,404 A | * | 9/1989 | Elliot | 222/568 |
| 4,893,732 A | * | 1/1990 | Jennings | 222/109 |
| 5,377,445 A | | 1/1995 | Brannon | 43/55 |
| 5,433,343 A | * | 7/1995 | Meshberg | 222/154 |
| 5,549,227 A | | 8/1996 | Klotz | 222/461 |
| 5,586,406 A | * | 12/1996 | Lin et al. | 43/55 |
| 5,794,803 A | * | 8/1998 | Sprick | 222/109 |

FOREIGN PATENT DOCUMENTS

JP          11-137147     *  5/1999

* cited by examiner

Primary Examiner—Darren W. Ark
(74) Attorney, Agent, or Firm—Richard K. Thomson

(57) ABSTRACT

A bait container has a housing, a top and bottom which at least partially surround the bait. A nozzle having a funnel portion and a bait-dispensing exit end extends from the top. A flow-inducement chamber permits a flow stream to be created which carries the bait into the bait-restraining exit end of the nozzle when the container is tipped. The fluid will drain through primary flow passages into the flow-inducement chamber and out of the chamber back into the housing through a secondary flow passage. A strap on the bait container permits the container to be suspended from a shoulder or waist of the fisherman. A stopper keeps the bait in the bait-dispensing portion until the fisherman is ready to dispense the bait into her/his hand. An insert for the exit end of the nozzle can permit different size bait to be dispensed one at a time. The bait container of the present invention permits the fisherman to dispense a single bait to be dispensed with a minimum loss of water, or wetting of his/her hand, and without the removal of the container's top.

20 Claims, 4 Drawing Sheets

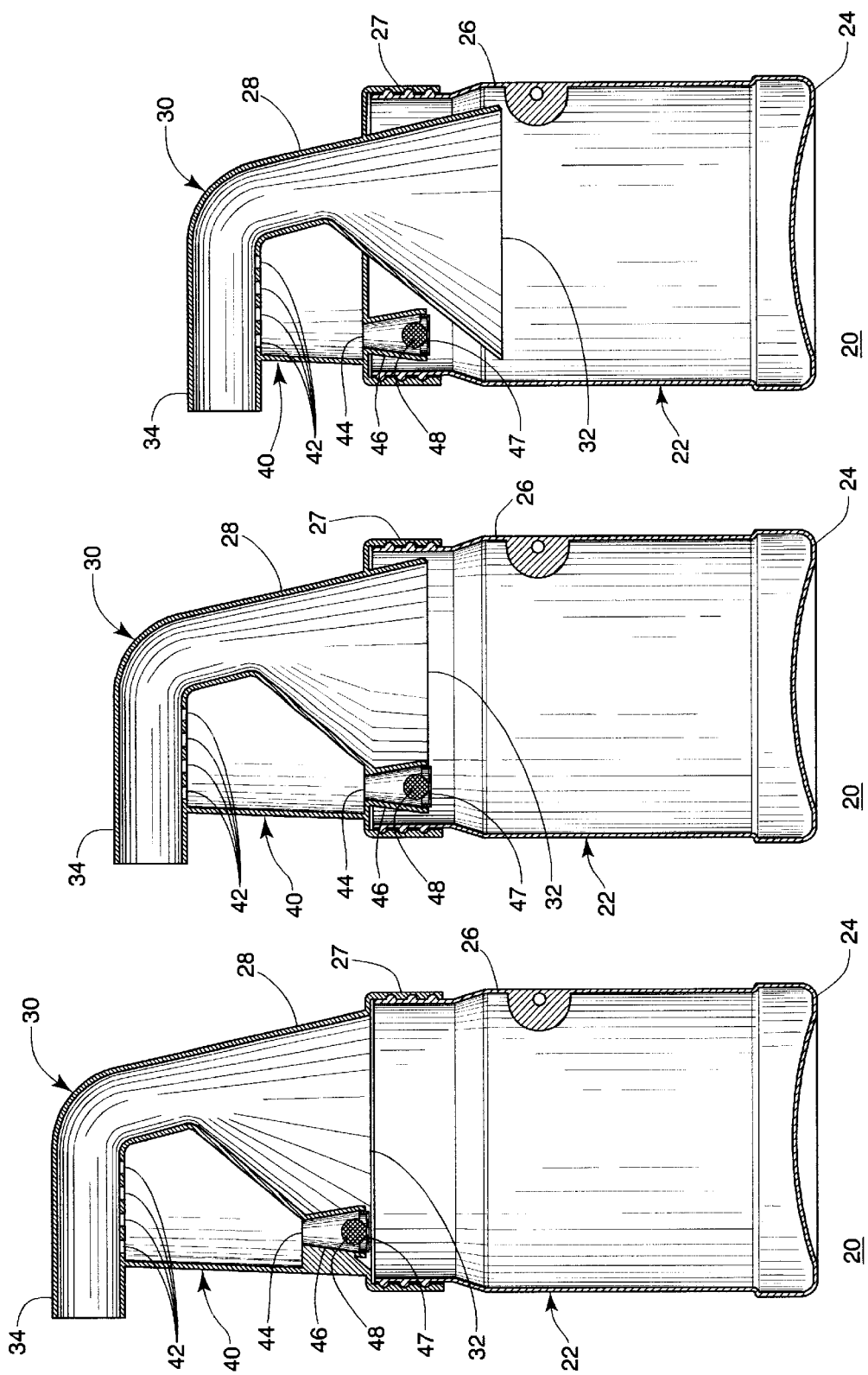

CONTAINER FOR DISPENSING LIVE BAIT

BACKGROUND OF THE INVENTION

The present invention is directed to the field of bait containers. More particularly, the present invention is directed to a bait container which is capable of dispensing live bait swimming in water in a controlled manner.

There are two popular types of bait containers for use with live wet bait, portable and stationary. One of the most widely used portable types consists of a jar onto which a lid is threaded, the lid having a strap secured to it. To utilize this bait container, a wading fisherman must hold her/his pole and line in one hand, or in the crook of or under her/his arm, grasp the container with the one hand, unscrew the lid with the other, and pour some of the water and hopefully only one of the minnows, or other bait, into her/his hand which is holding the lid, and then resecure the lid to the container while the bait is attempting to squirm out of that hand. If the lid is not fully secured, the entire contents of the container can be lost. The process is cumbersome at best and frequently results in one or more bait being dumped onto the ground or into the water and usually results in the level of life-sustaining water in the container being reduced. This water may dampen the user's clothing, including gloves if worn during cooler weather. To freshen the water in the container, the lid must be removed and the container submerged, risking loss of the bait within the container.

A second popular portable bait container is an oval shaped wading bucket made of galvanized steel which is of a size that can be held in a hand and can be strapped to a shoulder or the waist of a fisherman. The oval bucket has a similarly shaped lid made up of a flat surface surrounded by a side which extends about one inch above the surface. The lid fits snugly into the oval bucket, like a cork in a bottle, and must be pushed into the bucket when it is installed and pulled out of the bucket when it is removed. Holes in the flat surface of the lid allow stale water to be poured from the covered bucket and allow fresh water to enter into the covered bucket when the bucket is submerged. However, this bait container has several disadvantages. For example, when a fisherman who has the bucket attached to his or her shoulder or waist bends over, water can spill on his or her clothing. Additionally, if the container is accidentally tipped, water escapes and can cause bait, such as minnows, to die. Additionally, to secure a bait from this bait container, a fisherman must pull off the lid, hold or secure it and put his or her hand into the container to pick out a bait. It is often difficult to immediately grasp a bait because bait such as minnows swim around to avoid capture and bait such as crayfish and hellgromites often bite at a finger of the fisherman. In the process of securing the bait, the fisherman's hands or gloves become wet, which is particularly aggravating while fishing in cold weather.

The second type of container, stationary, is exemplified by a conventional bait bucket. Bait buckets may be equipped with a lid and with a liner. The liner is perforated, and the outer bucket retains the water which drains from the liner's openings when it is withdrawn from the bucket. To extract a bait from this container, the liner is usually partially withdrawn from the bucket to reduce the area the bait can occupy. The lid is opened and a hand inserted on a "fishing expedition" to capture and secure a bait for attachment to the fish hook. This type of container is bulky and not convenient for carrying. It frequently becomes an anchor to the fisherman preventing her/him from venturing very far in search of better fishing locations. It is difficult to change the water in the linerless variety.

Some prior patents show bait containers designed to enable fishermen to more readily obtain live wet bait from them while fishing. U.S. Pat. No. 2,644,269, issued in the name of J. E. Ormisher, shows a bait container which includes a minnow trap sieve shaped like a scoop mounted near the top of the container. This bait container can be tipped on one side to cause minnows or other live bait to swim within the area of the sieve. Bait which is trapped in the sieve can be removed by a fisherman when the bait container is turned upright. U.S. Pat. No. 4,862,634, issued in the name of Wayne C. Surface, shows a similar type of bait container. This bait container has a neck at the top with a porous separator mounted within the neck. The porous separator is attached to a pivotally mounted rod which extends through the bait container and has one side fastened to a lever located outside the container. The lever is used to cause the porous separator to either cover or uncover the opening to the neck at the top of the bait container. The porous separator can be swung down into the bait container so that the neck is open when the container is turned over, allowing bait to swim into the neck of the container. The porous separator is then rotated into place to cover the opening. Thereafter the bait container can be stood upright once again. Water then flows through the porous separator, thereby trapping on the separator in the neck of the bottle any bait which may have swum into the neck. The bait containers shown in these patents can be cumbersome to use and require fishermen to wait until bait swims into the sieve or neck of the container and must be opened repeatedly to remove bait.

A bi-directional bait dispenser for connection to a bottle is shown in U.S. Pat. No. 5,549,227, issued in the name of James Klatz. This dispenser includes a funnel which can be attached to a narrow-necked bottle to enable bait to be scooped into the bottle. A lid which includes a spout and a series of holes next to the spout is fastened to one portion of the periphery of the funnel. When the lid is attached to the top of the funnel, the bottle can be tipped to enable water to flow out of the spout and the holes and to permit bait to swim out of the spout and into the hand of a fisherman. Obviously, the fisherman's hand gets wet in the process of removing the bait, and water is lost from the bait container. And while the holes in the lid allow water to be poured from this bait container and fresh water to circulate within it when the container is submerged, these holes also allow water to spill on a fisherman's clothes and to accidentally spill from the container and as a result, bait to die, as explained above.

A number of patents show bait containers which use various types of nozzles for dispensing one grasshopper, or other fishing bait not living in water, at a time. See U.S. Pat. No. 3,308,507 issued in the name of Eddie Horton, U.S. Pat. No. 4,825,577 issued in the name of Roland Branon, and U.S. Pat. No. 5,377,445 issued in the name of Roland Branon. None of these bait containers is adapted to overcoming the problems involved in obtaining live minnows and other swimming bait from water in a live bait-dispensing container.

SUMMARY OF THE INVENTION

The present invention is a container for dispensing live bait which enables a fisherman to store and remove from the container live, wet bait, such as minnows, without removing a lid from the container when fishing, while minimizing water lost from the container, and minimizing any water on the fisherman's hands. The bait-dispensing container of this invention has a housing, including a bottom, a sidewall and a top, which at least partially encloses bait that is stored within the container. One of two ends of an exit nozzle is interconnected with one side of the housing, either the top or the sidewall. The exit nozzle extends generally in a lateral direction with respect to the housing from the area where the nozzle is interconnected with the housing and toward an exit end of the nozzle.

A flow inducement chamber is included between a side of the exit nozzle and the housing. The flow inducement chamber has at least one primary flow passage between it and the exit nozzle to allow water from the housing to flow from the exit nozzle and into the flow inducement chamber when the bait container is tipped and the exit end of the nozzle is closed off. This flow of water from the exit nozzle to the flow inducement chamber encourages bait swimming in the water to enter into the nozzle. The flow inducement chamber also has at least one secondary flow passage between it and the housing which permits water to flow from the flow inducement chamber and back into the housing. The secondary flow passage should inhibit the flow inducement chamber from filling when the bait container is tipped. This can be accomplished in any convenient manner, such as by using a one-way valve or a similar mechanism, which only allows water to flow from the flow inducement chamber to the housing. The flow inducement chamber can also be inhibited from filling when the bait container is tipped by making the secondary flow passage sufficiently small to prevent water from quickly filling the flow inducement chamber when the container is tipped. Using a mechanism, such as a one-way valve, as the secondary flow passage has the added advantage of allowing water to more quickly flow from the flow inducement chamber into the housing. Thus, in the event a bait is not retained in the nozzle when the bait container is tipped, if water flows quickly from the flow inducement chamber to the housing, the container can be immediately tipped again and water will flow through the nozzle and into the flow inducement chamber to help capture a bait in the nozzle.

The nozzle of the live bait-dispensing container of this invention can be made wider or narrower, as required, to enable live bait of different sizes, such as shiners and fatheads, to be removed from the nozzle one at a time. This can be accomplished by having containers with different sized nozzles or by adjusting the size of a nozzle of one container in any convenient manner, such as by placing an insert into the exit end of the nozzle to decrease its size.

Various other features, advantages and characteristics of the present invention will become apparent to one of ordinary skill in the art after reading the following specification. This invention does not reside in any one of the features of the containers for dispensing live bait disclosed above and in the following Detailed Description of Preferred Embodiments and claimed below. Rather, this invention is distinguished from the prior art by its particular combination of features which are disclosed. Important features of this invention have been described below and shown in the drawings to illustrate the best mode contemplated to date of carrying out this invention.

Those skilled in the art will realize that this invention is capable of embodiments which are different from those shown and described below and that the details of the structure of this container for dispensing live bait can be changed in various manners without departing from the scope of this invention. Accordingly, the drawings and description below are to be regarded as illustrative in nature and are not to restrict the scope of the invention. The claims are to be regarded as including such equivalent live bait-dispensing containers as do not depart from the spirit and scope of this invention.

BRIEF DESCRIPTION OF THE DRAWINGS

The preferred embodiments of the present invention are described in conjunction with the associated drawings in which like features are indicated with like reference numerals and in which:

FIG. 4A is a cross-sectional side view of an embodiment of this invention in which the entrance end of the nozzle begins above the top of the side walls of the container;

FIG. 4B is a cross-sectional side view of another embodiment of this invention in which the entrance end of the nozzle begins within the sidewalls of the container;

FIG. 4C is a cross-sectional side view of a third embodiment of this invention in which the entrance end of the nozzle begins further within the sidewalls of this invention;

DETAILED DESCRIPTION OF PREFERRED EMBODIMENTS

Figure 1:
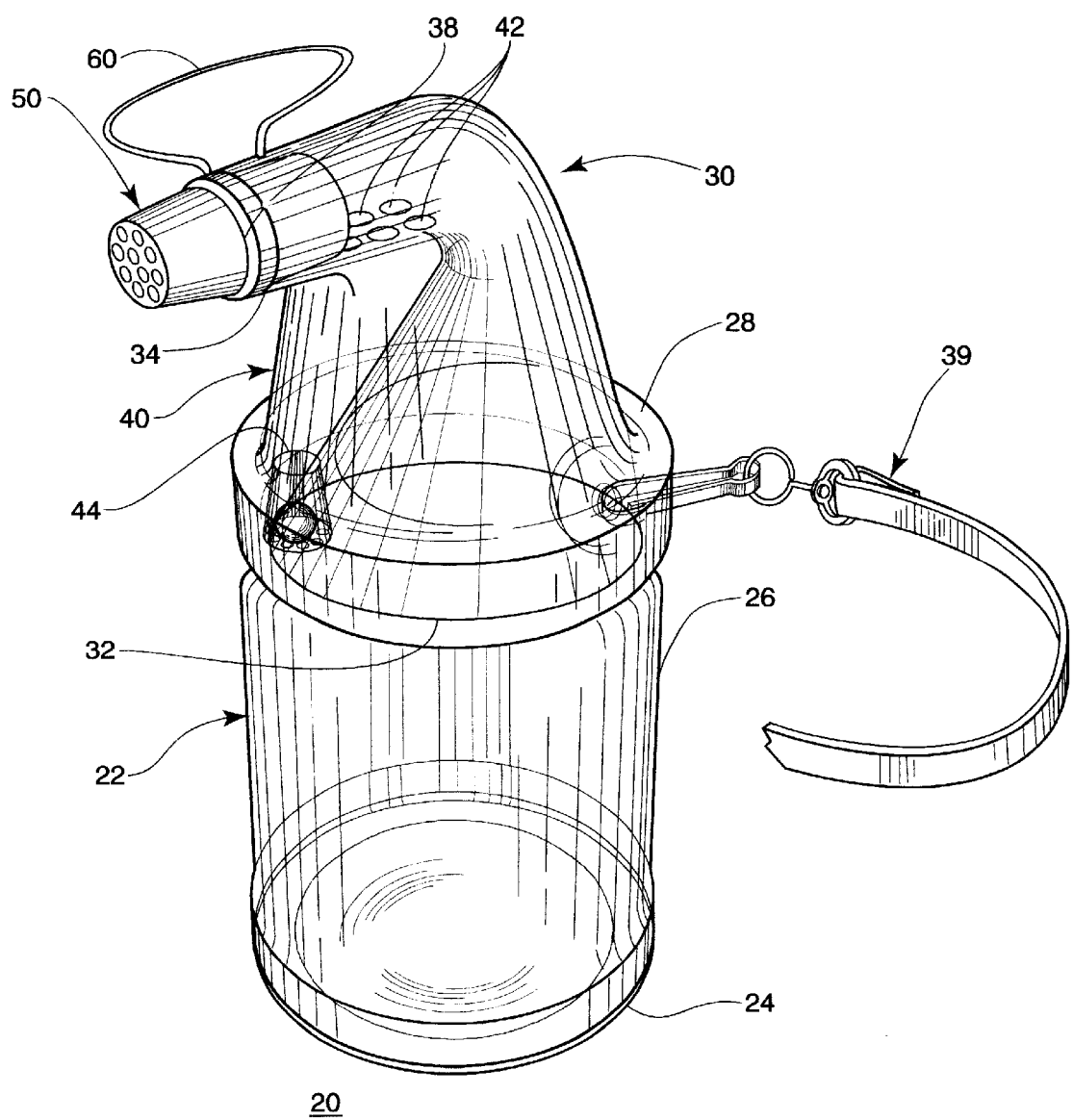
FIG. 1 is a perspective view of a first embodiment of the live bait-dispensing container of the present invention.
Figure 2:
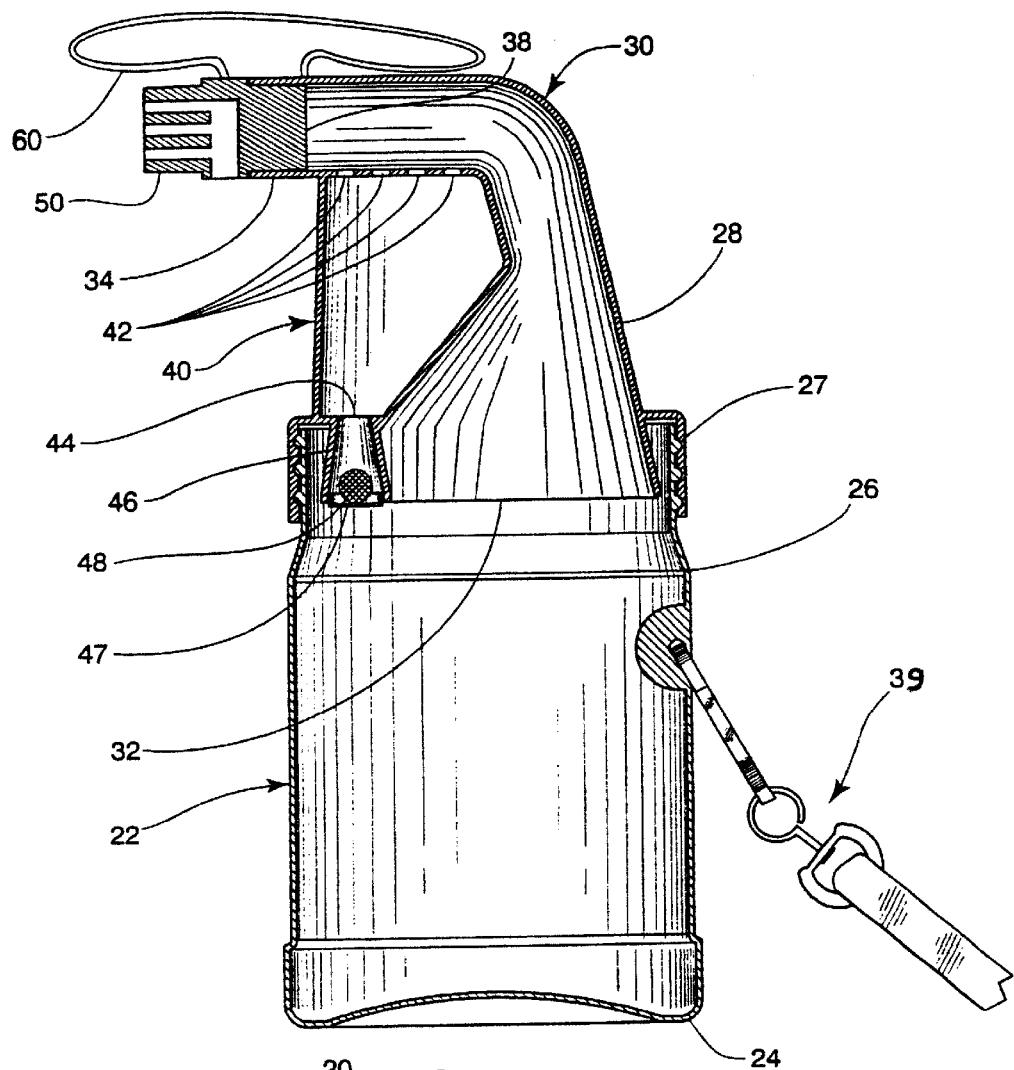
FIG. 2 is a cross-sectional side view of the first embodiment of the live bait-dispensing container of the present invention.
Figure 5A:
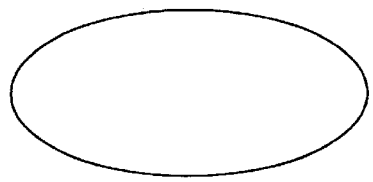
FIG. 5A is a schematic depiction of an oval cross section of the live bait-dispensing container of the present invention.
Figure 5B:
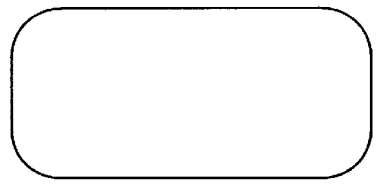
FIG. 5B is a schematic depiction of a rectangular cross section of the live bait-dispensing container of the present invention.

A first embodiment of the bait container for dispensing live bait of this invention is shown in FIG. 1 and in FIG. 2 generally at 20. Container 20 comprises a housing 22, a low-profile exit nozzle 30, a flow-inducing or inducement chamber 40, and a stopper 50. Container 20 can be made of any metal or plastic material convenient for the manufacturing process used to produce it. This would include but not be limited to galvanized metal, aluminum, glass or ceramic. However, container 20 is preferably at least partially made of durable, see-through plastic to facilitate the dispensing of bait by allowing a fisherman to see when a bait is retained in the nozzle 30. Housing 22 includes bottom 24, side wall 26 and top 28 which at least partially surround and enclose the bait. While housing 22 has a round configuration, it may have any number of cross-sectional configurations including oval, as shown in FIG. 5A, and rectangular, as shown in FIG. 5B. Many other shapes are possible for the housing 22. But any shape used should facilitate gripping and manipulating of the housing 22 by hand to facilitate fluid flow into the nozzle 30, through the laterally extending flow passage thereof, and to the flow enhancement chamber 40 as discussed below.

Figure 3:
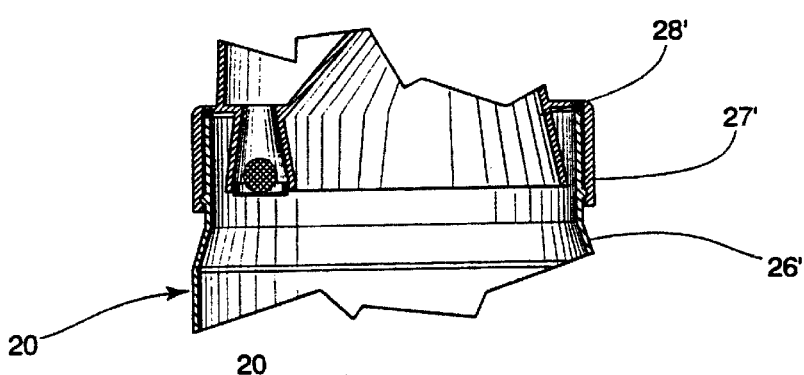
FIG. 3 is a cross-sectional, partial side view of an embodiment of this invention showing a friction fit between the top and sidewalls of the container.

If the container 20 has a rounded configuration, the upper end of side wall 26 and the lower end of the top 28 may be threaded as shown at 27 in FIG. 2. Thus, the top 28 can be screwed onto the side wall 26. As shown in FIG. 3 a container having 20 a rounded configuration may have, and all other configurations should have, a lower portion of a top 28' which will fit onto the upper periphery of side wall 26' as shown at 27', to form a snug, friction fit between them.

Referring again to FIGS. 1 and 2, low-profile exit nozzle 30 includes an entrance end 32 shown in the shape of a funnel and an exit end 34 from which bait are dispensed. The entrance end may be of any convenient shape, but the funnel allows bait to more readily flow into the nozzle 30. Nozzle 30 may extend from either side wall 26 or top 28 but preferably from top 28. When it extends from the top 28, the nozzle 30 may be positioned partially within the sidewalls 26, as depicted in FIG. 2 and in FIG. 4B which shows funnel portion 32 of nozzle 30 partially within housing 22. FIGS. 4A, 4B and 4C show a progression of the bait container of this invention from having the nozzle entrance end 32 on top of the sidewalls 26, as shown in FIG. 4A, to a bait container having the entrance end 32 within the sidewalls 26, as shown in FIG. 4B, to a bait container having the entrance end 32 further within the sidewalls 26 as seen in FIG. 4C. The advantage of the bait container shown in FIG. 4C is that it has a low profile in that the nozzle 30 is closer to the sidewalls 26. It is thus less likely to get entangled with fishing line if it is attached to the belt, waist or shoulder of a fisherman using a clip and strap 38 shown in FIGS. 1 and 2. Having the entrance end 32 of the nozzle 30 formed in the shape of a funnel aids in having bait enter the nozzle 30, even when the end 32 is further within the sidewall 26 as shown in FIG. 4C.

In accordance with the invention, a flow-inducement chamber 40 extends between the sidewalls of nozzle 30 and the housing 26. As shown in FIGS. 1 and 2, at least one primary flow passage 42, and preferably a plurality of primary flow passages, allow fluid to drain from the bait-restraining exit end 34 of nozzle 30 to the flow-inducement chamber 40. It is the presence of primary flow passages 42, in conjunction with air space available in flow inducement chamber 40, which permits creation of a flow stream within nozzle 30 that carries bait into bait-restraining exit end 34.

At least one secondary flow passage 44 is formed in upper surface of funnel portion 32 to permit water to drain from flow-inducement chamber 40 back into housing 22. It is possible that when the bait container 20 is tipped and manipulated to cajole a live bait into the bait-restraining exit end 34, some fluid could flow out of secondary flow passage 44 into flow-inducement chamber 40.

Figure 7:
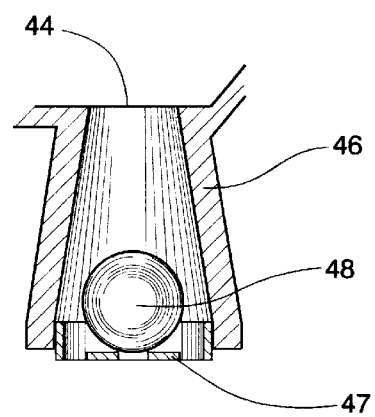
FIG. 7 is a cross-sectional side view of a one-way valve used in the bait-dispensing container of the present invention.

To limit this undesired flow, passage 44 could be equipped with a check valve or one-way float valve 46 (FIG. 7) which will block the passage 44 against such flow when the bait container 20 is tipped. Ball 48 is retained in conically shaped valve 46 by screen 47 or a cap with holes in it or any similar retainer. When housing 22 is tipped, ball 48 will be carried up against the lower surface of passage 44, preventing fluid from flowing into the flow inducement chamber 40. The float valve could have conical walls which permit water to rapidly re-enter housing 22 from chamber 40 after the bait container 20 is turned upright once again. Any other type of check valve could be used. In the event that no check valve 46 is used, passage 44 should be of a sufficiently small size so that water will not rapidly fill chamber 40, thereby preventing flow-inducement chamber 40 from working properly.

Figure 6:
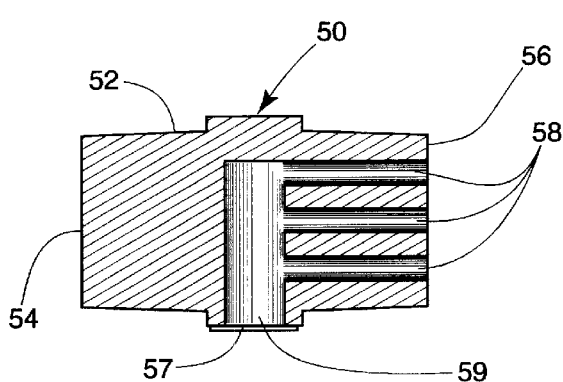
FIG. 6 is a cross-sectional side view of a plug used with the bait-dispensing container of the present invention.

While the bait is being positioned in the bait-dispensing portion 34 for dispensing, it is important that the exit 38 be blocked in some manner to prevent loss of fluid and, move importantly, the loss of bait. Stopper 50 is provided for this purpose. Stopper 50 has a wall 52 which may be slightly tapered to facilitate its insertion into exit 38. Stopper 50 may be attached to exit 38 by a thong 60. The bait-dispensing exit end 34 preferably has uniform diameter for the final 1½" to 2" to facilitate bait dispensing. A tapered region at the end of the exit end 34 could result in multiple baits becoming wedged. Connection of stopper 50 by thong 60 gives the fisherman one fewer thing to juggle during the bait dispensing process. As seen in FIG. 6 stopper 50 has a first solid end 54 and a second end 56 with passageway 58 extending therethrough to lateral passage 59. By inserting second end 56 into exit 38 the water within the housing 22 can be refreshed. Water can be dumped out of housing 22 through passageway 58, which is not of sufficient width to permit retained bait to pass through, and through the lateral passage 59. In addition, the end of passageway 58 could be equipped with a screen 57 which would retain the bait while permitting fluid to flow out. As an alternative, screen 57 could be replaced by a series of small holes.

Fluid flows out the axial portion of passageway 58 and then out of the laterally extending portion 59. Once the majority of the old fluid has been expelled with lateral extending passageway 59 positioned upwardly and the container 20 inverted, the fluid within container 20 can be refreshed by rotating container 20 to an upright position and submerging the container, permitting fluid to enter passageway 58. In addition, the use of stopper 50 in this position permits the bait container 20 to be submerged over night, for example, so fresh water may circulate into the container to refresh the bait.

Figure 8:
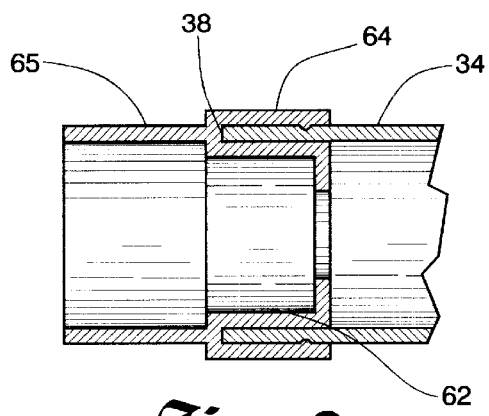
FIG. 8 is a cross-sectional side view of a diameter reducing insert used in conjunction with the bait dispensing container of the present invention.

It is envisioned that bait-dispensing container 20 could be used with a large variety of differing sized bait. For example, shiners and flathead minnows have a considerable variation in size. To accommodate such size variations, it is contemplated that exit 38 could be reduced in diameter by use of an insert 62 (FIG. 8). An insert 62 has an outer cylinder formed about it to form a pocket into which the exit 38 can fit. The pocket will secure insert 62 in place while dispensing of the smaller live bait takes place. To return the exit 38 to its larger size, insert 62 can be pulled off the exit 38 to disengage it from the pocket between the insert 62 and the outer cylinder 64. The insert 62 can have any of a number of configurations which enable it to be secured to the exit 38 at the exit end 34 of the nozzle 30.

In using the bait-dispensing container 20 of the present invention, housing 22 is grasped, the container is tilted forward or sideways and perhaps even partially inverted, to create a flow stream from the bottom of the housing 22, through the funnel 32, the balance of the nozzle 30, and the primary passages 42 into the chamber 40. This flow normally carries at least one bait through funnel 32 into bait-dispensing exit end 34 of the nozzle 30. If, on viewing the nozzle 30 through see-through plastic, more than one bait is captured in portion 34, by a slight side-to-side shaking, the extra bait can be restored to housing 22.

The fluid from the flow stream exits from the nozzle 30 through primary flow passages 42 and into flow-inducement chamber 40. It returns to housing 22 through secondary flow passage 44, which in the preferred embodiment of this invention includes valve 46, after the bait container is turned upright. Stopper 50 can be removed from exit 38 and the bait in exit end 34 dispensed into the fisherman's hand. Stopper 50 can be reinserted into exit 38 and container suspended from the fisherman's shoulder or waist using strap 39. When desiring to use container 20 with a smaller bait, insert 62 can be positioned in exit 38, with pocket formed by the outer cylinder 64 holding the insert 62 onto the exit 38. The stopper 50 can be inserted into extension 65 of the insert 62.

Various changes, alternatives and modifications will become apparent to those skilled in the art of making bait containers, following a reading of the foregoing specification. Those skilled in the art will recognize that the various features of this invention described above can be used themselves or in combination to produce a bait container. Additionally, this invention has been explained with respect to various details and arrangements of parts and components to describe the nature of this invention. Many modifications and changes can be made to these details and arrangements by those skilled in the art without departing from the spirit and scope of this invention. Thus, the appended claims are intended to be interpreted to cover such equivalent bait containers as do not depart from the spirit and scope of this invention.

I claim:

1. A live bait-dispensing container comprising:
    a) a housing for at least partially surrounding and retaining the live bait within said housing in a fluid, said housing having a bottom, a side wall, and a top at least partially enclosing the bait when the bait is retained therein;
    b) a low-profile exit nozzle interconnected to said housing, said low-profile nozzle having a flow passageway extending in a lateral direction in close proximity to said housing to provide said live bait dispensing container with an overall low profile configuration;
    c) a flow-inducement chamber interconnected with said exit nozzle and said housing, said flow-inducement chamber including at least one primary flow passage interconnected between a portion of said nozzle and said housing, said at least one primary flow passage extends transverse to an axis of said portion of the nozzle, and at least one secondary flow passage interconnected between said flow-inducement chamber and said housing to cause fluid within said housing to produce a stream of fluid through said nozzle, when said container is tipped, which will bear the live bait out of said housing into said nozzle when the live bait is retained in the container, the fluid of the stream returning from said nozzle to said housing by way of said at least one primary flow passage and said at least one secondary flow passage.

2. A live bait-dispensing container comprising:
    a) a housing for at least partially surrounding and retaining the live bait within said housing in a fluid, said housing having a bottom, a side wall, and a top at least partially enclosing the bait when the bait is retained therein
    b) an exit nozzle interconnected to said housing, said nozzle including a flow passageway extending generally in a lateral direction;
    c) a flow-inducement chamber mounted between a portion of said exit nozzle and said housing;
    d) at least one primary flow passage between said portion of said nozzle and said flow-inducement chamber;
    e) at least one secondary flow passage between said flow-inducement chamber and said housing to permit the fluid to drain from said flow-inducement chamber back into said housing; and
    f) a stopper closing said exit nozzle, said stopper including a passageway to allow ingress/egress of fluid into and out of said container,
whereby said bait-dispensing container can be manipulated to induce a flow stream of fluid through said exit nozzle which bears live bait into said exit nozzle when the live bait is ratained in the container, while the fluid creating and flow stream returns to said housing through said at least one primary and said at least one secondary flow passages, so that after said stopper is removed, the bait is dispensed from said exit nozzle with minimum loss of fluid from the container.

3. A live bait-dispensing container comprising:
    a) a housing for at least partially surrounding and retaining the live bait within said housing in a fluid, said housing having a bottom, a side wall, and a top at least partially enclosing the bait when the bait is retained therein;
    b) an exit nozzle interconnected to said housing, said nozzle including a flow passageway extending in a lateral direction, an entry portion and an elbow portion interconnectiong said flow passageway with said entry portion;
    c) a flow-inducement chamber mounted between a portion of said exit nozzle and said housing;
    d) at least one primary flow passage interconnected between said portion of said nozzle and said flow inducement chamber;
    e) at least one secondary flow passage interconnected between said flow inducement chamber and said housing to permit the fluid to drain from the flow-inducement champer back into said housing; and
    f) a stopper closing said exit nozzle;
    whereby when said bait-dispensing container is manipulated to induce a flow stream of fluid through said exit nozzle extending in a lateral direction which bears the live bait into said exit nozzle when the live bait is retained in the container, the fluid creating said flow stream returns to said housing through said at least one primary and said at least one secondary flow passages, so that after said stopper is removed, the bait is dispensed from said exit nozzle with minimum loss of fluid from the container.

4. The bait-despensing container of claim 3 wherein said exit nozzle extends from said top of said housing.

5. The bait-dispensing container of claim 3 wherein said exit nozzle is at least partially made of a see-through material to enable a user to know when a bait is positioned for removal.

6. The bait-dispensing container of claim 3 wherein said at least one primary flow passage comprises a plurality of openings in a side portion of said nozzle permitting fluid to flow out of said exit nozzle into said at least one flow-inducement chamber.

7. The bait-dispensing container of claim 6 wherein said secondary flow passage further comprises at least one orifice between said flow-inducement chamber and said housing permitting fluid entering said flow-inducement chamber to return to said housing.

8. The bait-dispensing container of claim 7 further comprising a check valve associated with said at least one orifice, said check valve permitting flow into said flow-inducement chamber only through said at least one primary flow passage from said nozzle.

9. The bait-dispensing container of claim 3 wherein said at least one secondary flow passage comprises at least one orifice equipped with a check valve permitting flow into said flow-inducement inducement chamber only through said at least one primary flow passage from said nozzle, said check valve having a generally conical side wall to facilitate rapid flow out of said flow inducement chamber into said housing.

10. The bait-dispensing container of claim 3 further comprising a strap permitting said container to be suspended from a shoulder, waist or belt of the user.

11. The bait-dispensing container of claim 3 wherein said stopper further comprises a passageway to allow ingress/egress of fluid into and out of said container.

12. The bait-dispensing container of claim 3 wherein said stopper further comprises a two sided stopper with a first side functioning to fully plug said exit nozzle, and a second opposing side including a passageway serving to permit ingress/egress of fluid while retaining bait in said container.

13. The bait-dispensing container of claim 3 further comprising an insert to alter the size of said exit nozzle to facilitate the dispensing of smaller bait one at a time.

14. The bait-dispensing container of claim 3 comprising an insert having a smaller internal diameter which is received within said exit nozzle.

15. The bait-dispensing container of claim 3 wherein said exit nozzle includes a first funnel portion which is positioned below said top and a second portion which extends through said top.

16. The bait-dispensing container of claim 3 wherein said exit nozzle is connected to said top and extends upwardly therefrom before turning and extending generally laterally thereover.

17. The bait-dispensing container of claim 3 wherein said top removably attaches to an upper portion of said side wall of said housing, said housing with said top removed providing a wide mouth for ingress/egress of fluid and bait during filling and emptying, and said top includes said exit nozzle having an exit end and a funnel portion at an end opposite said exit end.

18. The bait-dispensing container of claim 3 wherein said nozzle extends generally in a lateral direction and does not extend appreciably beyond a lateral extent of said side wall so as not to become a potential entanglement for fishing line, the user's clothing and surrounding items.

19. A bait-dispensing container of claim 3 wherein portions of said housing and said nozzel are made of transparent plastic to faciliate dispensing of the live bait therein.

20. A live bait-dispensing container comprising:
a) a housing for at least partially surrounding and retaining the live bait within said housing in a fluid, said housing having a bottom, a side wall, and a top at least partially enclosing the bait when the bait is retained therein;
b) an exit nozzle interconnected to said housing, said nozzle having a flow passageway extending generally in a lateral direction;
c) a flow-inducement chamber mounted between a portion of said exit nozzle and said housing;
d) at least one primary flow passage between said portion of said nozzle and said flow inducement chamber;
e) at least one secondary flow passage between said flow-inducement chamber and said housing to permit the fluid to drain from said flow-inducement chamber back into said housing, said secondary flow passage including at least one orifice equipped with a check valve permitting flow into said flow-inducement chamber only through said at least one primary flow passage from said nozzle, said check valve having a generally conical side wall to facilitate rapid flow out of said flow inducement chamber into said housing; and
f) a stopper closing said exit nozzle;
whereby said bait-dispensing container can be manipulated to induce a flow stream of fluid through said exit nozzle which bears live bait into said exit nozzle when the live bait is retained in the container, while the fluid creating said flow stream returns to said housing through said at least one primary and said at least one secondary flow passages, so that after said stopper is removed, the bait is dispensed from said exit nozzle with minimum loss of fluid from the container.

\* \* \* \* \*